US012703352B2

(12) United States Patent
Diamond et al.

(10) Patent No.: US 12,703,352 B2
(45) Date of Patent: Aug. 11, 2026

(54) SYSTEM AND METHOD FOR IDENTIFYING A VEHICLE IN SUBOPTIMAL CONDITION

(71) Applicant: Ford Global Technologies, LLC, Dearborn, MI (US)

(72) Inventors: Brendan Diamond, Grosse Pointe, MI (US); Keith Weston, Canton, MI (US); Anthony Maraldo, Southgate, MI (US); Andrew Denis Lewandowski, Sterling Heights, MI (US); Michael Alan McNees, Flat Rock, MI (US); Jordan Barrett, Milford, MI (US)

( * ) Notice: Subject to any disclaimer, the term of this patent is extended or adjusted under 35 U.S.C. 154(b) by 301 days.

(21) Appl. No.: 18/411,708

(22) Filed: Jan. 12, 2024

(65) Prior Publication Data

US 2025/0229771 A1 Jul. 17, 2025

(51) Int. Cl.

*B60W 30/09* (2012.01)
*B60W 30/095* (2012.01)
*B60W 50/14* (2020.01)
*B60W 60/00* (2020.01)
*H04W 4/40* (2018.01)

(52) U.S. Cl.

CPC ........ *B60W 30/09* (2013.01); *B60W 30/0956* (2013.01); *B60W 50/14* (2013.01); *B60W 60/0015* (2020.02); *H04W 4/40* (2018.02); *B60W 2050/143* (2013.01); *B60W 2050/146* (2013.01); *B60W 2420/403* (2013.01);

(Continued)

(58) Field of Classification Search

CPC .. B60W 30/09; B60W 30/0956; B60W 50/14; B60W 60/0015; B60W 2050/143; B60W 2050/146; B60W 2420/403; B60W 2420/408; B60W 2554/404; B60W 2556/65; B60W 40/04; B60W 50/00; H04W 4/40; B60K 35/21

See application file for complete search history.

(56) References Cited

U.S. PATENT DOCUMENTS 10,625,658 B2 4/2020 Taylor
2018/0208196 A1* 7/2018 Kurata ................ G06V 20/584

(Continued)

FOREIGN PATENT DOCUMENTS

WO 2020014090 A1 1/2020

OTHER PUBLICATIONS

Choe, Tae Eun, et al. "Hazardnet: Road debris detection by augmentation of synthetic models." Proceedings of the IEEE/CVF Conference on Computer Vision and Pattern Recognition. 2023. (Year: 2023).*

(Continued)

*Primary Examiner* — Russell Frejd
*Assistant Examiner* — Ana D Thomas
(74) *Attorney, Agent, or Firm* — Joseph Zane; Eversheds Sutherland (US) LLP

(57) ABSTRACT

A first vehicle including a sensor unit and a processor is disclosed. The sensor unit may be configured to capture inputs associated with a first vehicle surrounding. The processor may be configured to obtain the inputs from the sensor unit, and determine a presence of a second vehicle in a suboptimal condition in proximity to the first vehicle based on the inputs. The processor may further perform a pre-defined action responsive to determining the presence of the second vehicle in the suboptimal condition.

19 Claims, 5 Drawing Sheets

(52) U.S. Cl.
CPC . *B60W 2420/408* (2024.01); *B60W 2554/404* (2020.02); *B60W 2556/65* (2020.02)

(56) References Cited

U.S. PATENT DOCUMENTS

| | | | | |
|---|---|---|---|---|
| 2020/0034785 | A1 | 1/2020 | Romano et al. | |
| 2020/0255004 | A1* | 8/2020 | Raichelgauz | G06V 20/597 |
| 2022/0017085 | A1* | 1/2022 | Yokoyama | G01S 13/878 |
| 2022/0242302 | A1* | 8/2022 | Goetz | B60P 7/0869 |
| 2022/0388518 | A1 | 12/2022 | Oba | |
| 2023/0051547 | A1 | 2/2023 | Roberts et al. | |
| 2024/0124007 | A1* | 4/2024 | Hawley | G06T 7/70 |
| 2025/0209910 | A1* | 6/2025 | Kimura | G08G 1/0133 |

OTHER PUBLICATIONS

Choe, Tae Eun, et al. "Hazardnet: Road debris detection by augmentation of synthetic models", Proceedings of the IEEE/CVF Conference on Computer Vision and Pattern Recognition, 2023, pp. 161-171. (Year: 2023).*

Ramesh Singh, et. al., Advances and Applications in Mathematical Sciences, Truck Overloading Detection and Engine Locking System, Jan. 21, 2021, pp. 7157-7162, vol. 21, Issue 12.

* cited by examiner

SYSTEM AND METHOD FOR IDENTIFYING A VEHICLE IN SUBOPTIMAL CONDITION

FIELD

The present disclosure relates to a system and method for identifying a vehicle in suboptimal condition on a road.

BACKGROUND

There are known instances of users driving vehicles in suboptimal condition on highways, roads, etc. For example, many users drive vehicles having loads that are sub-optimally secured or not secured at all to the vehicle cargo bed. Further, there are known instances of users driving vehicles with broken parts (e.g., broken bumper, partially or fully broken side rearview mirrors, etc.) or with fully or partially open vehicle doors, hoods, liftgates, trunks and/or other vehicle closures.

Such instances may cause inconvenience to the commuters who may be driving in proximity to the vehicles in suboptimal condition.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
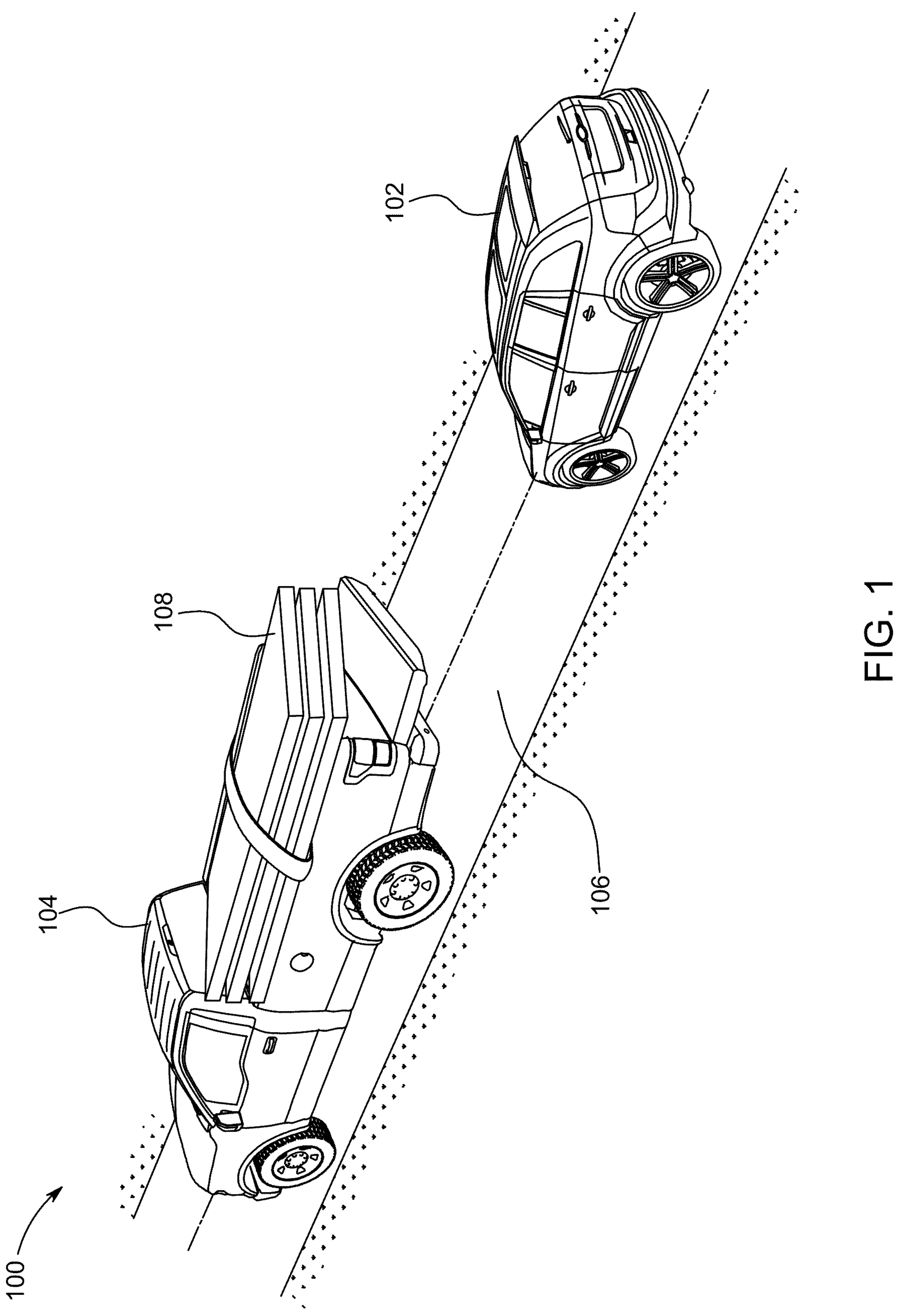
FIG. 1 depicts an example environment in which techniques and structures for providing the systems and methods disclosed herein may be implemented.

The present disclosure describes a first vehicle configured to determine other vehicles (e.g., a second vehicle) that may be in suboptimal condition and travelling in proximity to the first vehicle. Responsive to determining such vehicles, the first vehicle may perform one or more predefined actions. The second vehicle may be in the suboptimal condition when, e.g., a load may be loosely or minimally secured to the second vehicle, one or more second vehicle components may be broken or falling off, a trailer may be sub-optimally attached to the second vehicle, and/or the like.

In some aspects, the first vehicle may determine that the second vehicle may be in the suboptimal condition based on inputs obtained from a first vehicle sensor unit. In an exemplary aspect, the first vehicle sensor unit may include exterior vehicle cameras, Radio Detection and Ranging (radar) sensors, Light Detection and Ranging (lidar) sensors, and/or the like.

In some aspects, responsive to determining a presence of the second vehicle in suboptimal condition in proximity to the first vehicle, the first vehicle may transmit a maintenance notification to the second vehicle. The first vehicle may transmit the maintenance notification to the second vehicle via, e.g., vehicle-to-vehicle (V2V) communication or vehicle-to-infrastructure (V2I) communication. Responsive to receiving the maintenance notification from the first vehicle, a second vehicle operator may take remedial actions. For example, the second vehicle operator may properly secure the load to the second vehicle, responsive to receiving the maintenance notification from the first vehicle, thereby enhancing convenience of commuters who may be travelling on the same road as the second vehicle.

In further aspects, responsive to determining the presence of the second vehicle in suboptimal condition in proximity to the first vehicle, the first vehicle may output a first alert notification on a first vehicle Human-Machine Interface (HMI), indicating to a first vehicle operator that the second vehicle in proximity to the first vehicle may be in suboptimal condition. Responsive to viewing/hearing the first alert notification, the first vehicle operator may move the first vehicle away from the second vehicle. For example, the first vehicle operator may change road lanes or travel route responsive to viewing/hearing the first alert notification. In some aspects, the first vehicle may itself move away from the second vehicle if the first vehicle is an autonomous vehicle, responsive to determining a second vehicle presence in proximity to the first vehicle.

In additional aspects, responsive to determining the presence of the second vehicle in suboptimal condition in proximity to the first vehicle, the first vehicle may output a second alert notification to one or more other vehicles that may be located in proximity to the first vehicle, informing the other vehicle about the second vehicle presence on the road. Responsive to receiving the second alert notification, operators associated with the other vehicles may maneuver respective vehicle movements to move away from the second vehicle.

The present disclosure discloses a first vehicle that determines a presence of a second vehicle in suboptimal condition in proximity to the first vehicle, and takes remedial actions responsive to determining the second vehicle. The first vehicle further alerts other vehicles in proximity to the first vehicle about the presence of the second vehicle in suboptimal condition, thereby ensuring that the other vehicles may take timely remedial actions, e.g., by changing lanes. The first vehicle further notifies the second vehicle about the potential suboptimal condition, thereby assisting the second vehicle operator to timely repair the second vehicle and/or properly secure the load to the second vehicle.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a first vehicle 102 and a second vehicle 104 travelling in proximity to each other on a road 106. Each of the first and second vehicles 102, 104 may take the form of any passenger or commercial vehicle such as, for example, a car, a work vehicle, a crossover vehicle, a van, a minivan, etc. Further, each vehicle 102, 104 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

In some aspects, the second vehicle 104 may be carrying a load 108 on a vehicle cargo bed. In the exemplary aspect depicted in FIG. 1, the load 108 includes mattresses; however, the present disclosure is not limited to such an aspect. The load 108 may be of any type that the second vehicle 104 may be carrying on the vehicle cargo bed. Further, the load 108 is not limited to be disposed on the vehicle cargo bed. In alternative aspects, the load 108 may be disposed on a vehicle top portion, a vehicle tailgate, and/or the like, without departing from the present disclosure scope.

The first vehicle 102 may be communicatively coupled with the second vehicle 104 (and other vehicles (not shown) travelling on the road 106) via vehicle-to-vehicle (V2V) communication, vehicle-to-infrastructure (V2I) communication, and/or the like. The first vehicle 102 may include a sensor unit or a sensor suite (shown as vehicle sensory system 232 in FIG. 2) that may be configured to obtain/capture inputs associated with a first vehicle's surroundings. In an exemplary aspect, the sensor unit may include vehicle exterior cameras that may be configured to capture images of the first vehicle's surroundings, e.g., of geographical areas in proximity to vehicle's front, rear, left and right portions. In additional aspects, the sensor unit may include Radio Detection and Ranging (radar) sensors, Light Detection and Ranging (lidar) sensors, and/or the like.

The first vehicle 102 may be configured to determine that the second vehicle 104 may be in suboptimal condition based on the inputs captured by the sensor unit. In some aspects, the second vehicle 104 may be in suboptimal condition when the load 108 may be sub-optimally secured (or loosely/minimally secured) or not secured at all to the second vehicle 104. For example, the first vehicle 102 may determine that the second vehicle 104 may be in suboptimal condition when an extent of relative movement between the load 108 and the second vehicle 104 may be greater than a predefined movement threshold (indicating that the load 108 may be loosely secured to the second vehicle 104), when the second vehicle 104 may be in motion on the road 106. As another example, the first vehicle 102 may determine that the second vehicle 104 may be in suboptimal condition when one or more attachment members or straps securing the load 108 to the second vehicle 104 (e.g., to the vehicle cargo bed) may be loose or broken, or a count of straps may be less than a predefined count threshold (or the straps may be missing). As yet another example, the first vehicle 102 may determine that the second vehicle 104 may be in suboptimal condition when sub-parts associated with the load 108 (e.g., flaps, covers, parts of cardboard, foam, cloth, etc.) may be flying off the load 108, when the second vehicle 104 may be moving on the road 106.

In further aspects, the second vehicle 104 may be in suboptimal condition when one or more vehicle components may be broken or falling off (or temporarily assembled using duct-tape or similar attachment means), one or more vehicle doors, hoods, liftgates, trunks and/or other vehicle closures may be open, and/or the like, when the second vehicle 104 may be moving on the road 106.

Responsive to determining that the second vehicle 104 may be in suboptimal condition as described above, the first vehicle 102 may perform one or more predefined actions. For example, the first vehicle 102 may transmit a maintenance notification to the second vehicle 104 via V2V or V2I communication, indicating that the load 108 may be loosely secured or the second vehicle 104 may have one or more broken vehicle components. A second vehicle operator may view/hear the maintenance notification (e.g., via a second vehicle Human-Machine Interface (HMI)) and may accordingly take remedial actions.

As another example, the first vehicle 102 may display a first alert notification on a first vehicle HMI, indicating that the second vehicle 104 may be in suboptimal condition. Responsive to viewing/hearing the first alert notification, a first vehicle operator may maneuver a first vehicle movement such that the first vehicle 102 moves away from the second vehicle 104 (e.g., the first vehicle operator may change lanes on the road 106). By moving away from the second vehicle 104, the first vehicle operator may prevent the first vehicle 102 from the loosely secured load 108 and/or broken or falling vehicle components. In some aspects, if the first vehicle 102 is an autonomous vehicle, the first vehicle 102 may autonomously move away from the second vehicle 104 responsive to determining that the second vehicle 104 may be in suboptimal condition.

As yet another example, responsive to determining that the second vehicle 104 may be in suboptimal condition, the first vehicle 102 may transmit a second alert notification to one or more other vehicles (e.g., a third vehicle, not shown) that may be in proximity to the first vehicle 102 and/or the second vehicle 104, indicating to the third vehicle that the second vehicle 104 may be in suboptimal condition. Responsive to hearing/viewing the second alert notification, a third vehicle operator may maneuver a third vehicle movement such that the third vehicle moves away from the second vehicle 104. In this manner, the first vehicle 102 informs other vehicles on the road 106 about the presence of the second vehicle 104 in suboptimal condition, thereby enabling the other vehicles to timely maneuver respective vehicle movements and significantly enhancing commuter convenience.

Further vehicle details are described below in conjunction with FIG. 2.

The first vehicle 102 and the second vehicle 104 implement and/or perform operations, as described here in the present disclosure, in accordance with the owner manual and safety guidelines. In addition, any action taken by the vehicle operators based on the notifications provided by the first vehicle 102 should comply with all the rules specific to the location and operation of the first and second vehicles 102, 104 (e.g., Federal, state, country, city, etc.). The notifications, as provided by the first vehicle 102, should be treated as suggestions and only followed according to any rules specific to the location and operation of the first and second vehicles 102, 104.

Figure 2:
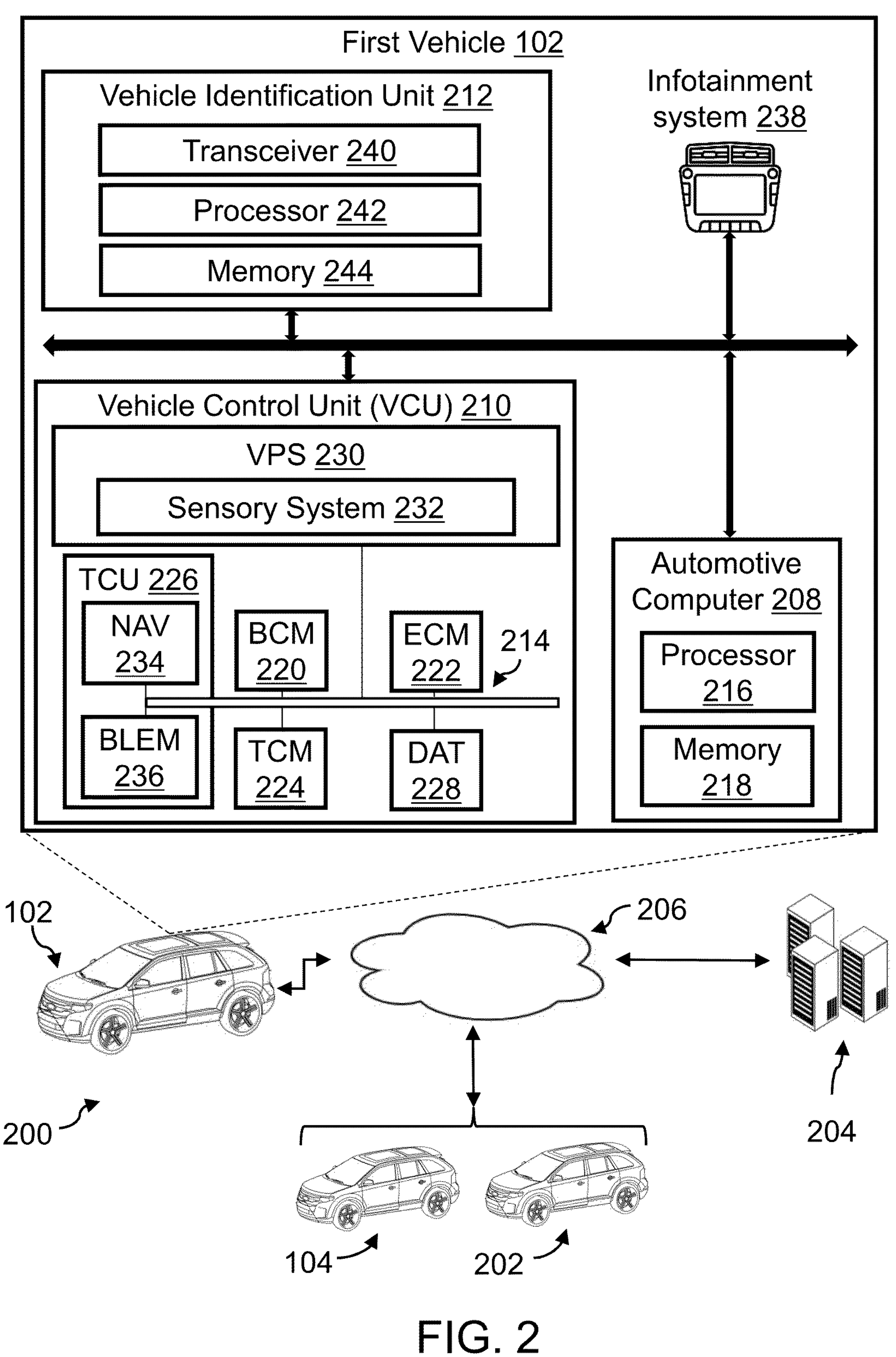
FIG. 2 depicts a block diagram of a system for identifying a vehicle in suboptimal condition in accordance with the present disclosure.

FIG. 2 depicts a block diagram of a system 200 for identifying a vehicle in suboptimal condition in accordance with the present disclosure. While describing FIG. 2, references will be made to FIGS. 3 and 4.

The system 200 may include the first vehicle 102, the second vehicle 104, a third vehicle 202, and one or more servers 204 (or server 204) communicatively coupled with each other via one or more networks 206 (or a network 206). In some aspects, the first vehicle 102, the second vehicle 104 and the third vehicle 202 may additionally be communicatively coupled with each other via V2V communication and/or V2I communication. Further, the first vehicle 102, the second vehicle 104 and the third vehicle 202 may be travelling on the road 106. Furthermore, as described above in conjunction with FIG. 1, the second vehicle 104 may be carrying the load 108.

The server 204 may be part of a cloud-based computing infrastructure and may be associated with and/or include a Telematics Service Delivery Network (SDN) that provides digital data services to the first vehicle 102, the second vehicle 104, the third vehicle 202, and other vehicles (not shown) that may be part of a vehicle fleet. In further aspects, the server 204 may be associated with authorities or a vehicle maintenance firm that may provide maintenance and/or repair services to the first, second and third vehicles 102, 104, 202 (and other vehicles).

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The first vehicle 102 may include a plurality of units including, but not limited to, an automotive computer 208, a Vehicle Control Unit (VCU) 210, and a vehicle identification unit 212 (or unit 212). The VCU 210 may include a plurality of Electronic Control Units (ECUs) 214 disposed in communication with the automotive computer 208.

The automotive computer 208 and/or the unit 212 may be installed anywhere in the first vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable storage medium or memory storing a vehicle identification program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (e.g., the server 204), and other vehicles (e.g., the second and third vehicles 104, 202) operating as part of a vehicle fleet. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or a sensor unit). The vehicle sensory system 232 may include one or more vehicle sensors including, but not limited to, a Radio Detection and Ranging (RADAR or "radar") sensor configured for detection and localization of objects inside and outside the first vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, a vehicle gyroscope, a vehicle magnetometer, ultrasonic sensors, etc. In some aspects, the vehicle sensory system 232 may be configured to capture inputs associated with the first vehicle's surroundings. For example, the vehicle exterior cameras included in the vehicle sensory system 232 may be configured to capture images of geographical areas in proximity to first vehicle's front, rear, left side and right side portions. The vehicle sensory system 232 may be further configured to transmit sensor inputs to the unit 212 at a predefined frequency.

In some aspects, the VCU 210 may control vehicle operational aspects and implement one or more instruction sets received from the server 204, from one or more instruction sets stored in the memory 218, including instructions operational as part of the unit 212.

The TCU 226 may be configured and/or programmed to provide vehicle connectivity to wireless computing systems onboard and off board the first vehicle 102, and may include a Navigation (NAV) receiver 234 for receiving and processing a GPS signal, a BLE® Module (BLEM) 236, a Wi-Fi transceiver, an ultra-wideband (UWB) transceiver, and/or other wireless transceivers (not shown in FIG. 2) that may be configurable for wireless communication (including cellular communication) between the first vehicle 102 and other systems (e.g., a vehicle key fob, not shown in FIG. 2, the server 204, a user device associated with a first vehicle user, etc.), computers, and modules. The TCU 226 may be disposed in communication with the ECUs 214 by way of a bus.

The ECUs 214 may control aspects of vehicle operation and communication using inputs from human drivers, inputs from the automotive computer 208, the unit 212, and/or via wireless signal inputs/command signals received via the wireless connection(s) from other connected devices, such as the server 204, the user device associated with the first vehicle user, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion, and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion, and/or output or display notifications, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered as limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the first vehicle 102, may include a transceiver 240, a processor 242, and a computer-readable memory 244.

The transceiver 240 may be configured to receive information/inputs from one or more external devices or systems, e.g., the server 204, the user device associated with the first vehicle user, and/or the like, via the network 206. Further, the transceiver 240 may transmit notifications, requests, signals, etc. to the external devices or systems or vehicles. In addition, the transceiver 240 may be configured to receive information/inputs from vehicle components such as the VCU 210. Further, the transceiver 240 may transmit signals (e.g., command signals) or notifications to the vehicle components such as the BCM 220, the infotainment system 238, and/or the like.

The processor 242 and the memory 244 may be same as or similar to the processor 216 and the memory 218, respectively. In some aspects, the processor 242 may utilize the memory 244 to store programs in code and/or to store data for performing aspects in accordance with the disclosure. The memory 244 may be a non-transitory computer-readable storage medium or memory storing the vehicle identification program code.

In operation, the processor 242 may obtain the sensor inputs from the vehicle sensory system 232, when the first vehicle 102 may be travelling on the road 106. Responsive to obtaining the sensor inputs, the processor 242 may determine that the second vehicle 104 in suboptimal condition may be present in proximity to the first vehicle 102 based on the sensor inputs. Specifically, the processor 242 may determine that the second vehicle 104, which may be travelling in proximity to the first vehicle 102, may be in suboptimal condition based on the sensor inputs (e.g., images) obtained from the vehicle sensory system 232.

In some aspects, the processor 242 may determine that the second vehicle 104 may be in suboptimal condition when the load 108 disposed on the second vehicle 104 may be sub-optimally secured (e.g., loosely or minimally secured or not secured at all) to the second vehicle 104. The processor 242 may implement one or more different methods/approaches and one or more machine learning algorithms (that may be pre-stored in the memory 244) to determine that the load 108 may be sub-optimally secured to the second vehicle 104.

In a first exemplary aspect, the processor 242 may determine that the load 108 may be sub-optimally secured to the second vehicle 104 by determining an extent of relative movement between the load 108 and the second vehicle 104 based on the sensor inputs, when the second vehicle 104 may be moving on the road 106. In some aspects, the processor 242 may determine the extent of relative movement by performing Region-Of-Interest (ROI) still-frame analysis based image processing for the images captured by the vehicle sensory system 232. For example, the processor 242 may determine that the load 108 may have moved a small distance (e.g., 3-8 centimeters) relative to its origin position over the last 10-20 image frames, when the second vehicle 104 moves on the road 106 and the vehicle sensory system 232 captures the images of the load 108 and the second vehicle 104. Responsive to determining the distance or the extent of relative movement, the processor 242 may compare the extent with a predefined movement threshold. The processor 242 may determine that the load 108 may be sub-optimally secured to the second vehicle 104 (and hence the second vehicle 104 may be in suboptimal condition) when the extent may be greater than the predefined movement threshold.

In a second exemplary aspect, the processor 242 may determine that the load 108 may be sub-optimally secured to the second vehicle 104 by determining a count of attachment members or straps securing the load 108 to the second vehicle 104 based on the sensor inputs. The processor 242 may determine that the load 108 may be sub-optimally secured to the second vehicle 104 (and hence the second vehicle 104 may be in suboptimal condition) when the count may be less than a predefined count threshold or equal to zero.

In a third exemplary aspect, the processor 242 may determine (based on the sensor inputs) that the load 108 may be sub-optimally secured to the second vehicle 104 based on a condition or manner in which the straps may be securing the load 108 to the second vehicle 104. As an example, the processor 242 may analyze the sensor inputs to determine a relative movement between the straps and the load 108 (e.g., by analyzing the contrast of the straps) when the second vehicle 104 moves on the road 106, and determine that the load 108 may be sub-optimally secured to the second vehicle 104 when the movement of straps relative to the load 108 may be greater than a predefined threshold. Stated another way, the processor 242 may determine that the load 108 may be sub-optimally secured to the second vehicle 104 when the straps may be loosely securing the load 108 to the second vehicle 104 (which may be causing greater relative movement between the load 108 and the straps when the second vehicle 104 moves).

In a fourth exemplary aspect, the processor 242 may determine (based on the sensor inputs) that the load 108 may be sub-optimally secured to the second vehicle 104 when the load 108 may be placed on an open second vehicle tailgate, with no straps securing the load 108 to the tailgate/second vehicle 104. The processor 242 may additionally determine that the load 108 may be sub-optimally secured to the second vehicle 104 when the load 108 may be placed on the open second vehicle tailgate, and a tailgate extender may not be properly utilized to secure load shifting/movement.

In a fifth exemplary aspect, the processor 242 may determine (based on the sensor inputs) that the load 108 may be sub-optimally secured to the second vehicle 104 when the load 108 may be crooked or bent relative to the vehicle cargo bed or a trailer bed. Specifically, in this case, the processor 242 may determine an inclination angle of a load plane relative to a second vehicle plane or a second vehicle cargo bed plane based on the sensor inputs, and determine that the load 108 may be crooked when the inclination angle may be greater than a predefined angle threshold.

Although the description above describes an aspect where the processor 242 determines that the second vehicle 104 may be in suboptimal condition when the load 108 may be sub-optimally secured to the second vehicle 104, the present disclosure is not limited to such an aspect. In further aspects, the processor 242 may determine (based on the sensor inputs) that the second vehicle 104 may be in suboptimal condition when no red flags may be disposed on the second vehicle 104 when the load 108 may be extending beyond the second vehicle dimensions by greater than a permissible extension length (e.g., 2 feet).

The processor 242 may further determine (based on the sensor inputs) that the second vehicle 104 may be in suboptimal condition when the load 108 may be large in size, and may potentially fall off the second vehicle 104 when the second vehicle 104 moves. In this case, the processor 242 may determine that the load 108 may potentially fall off by using a pre-stored algorithm that calculates the fulcrum and determines a percentage of the load 108 inside the second vehicle periphery and a load percentage outside the second vehicle periphery. The processor 242 may determine that a probability of the load 108 falling off the second vehicle 104 may be high when the load percentage outside the second vehicle periphery may be greater than a predefined percentage threshold. In some aspects, the processor 242 may further determine that the load 108 may potentially fall off by using motive and non-motive camera algorithm to determine load teetering/movement relative to the second vehicle movement. When the relative movement may be high, the processor 242 may determine that the load 108 may potentially fall off the second vehicle 104, and hence the second vehicle 104 may be in suboptimal condition.

The processor 242 may further determine (based on the sensor inputs) that the second vehicle 104 may be in suboptimal condition when tarps or covers covering the load 108 and/or portions of the second vehicle 104 may potentially fly off, when the second vehicle 104 may be moving on the road 106. The processor 242 may be further configured to monitor the second vehicle 104 based on the sensor inputs, and identify presence of one or more smaller/lighter items that may potentially fly from the second vehicle cargo space and/or the load 108, such as cardboard, foam, cloth, leaves, and/or the like, when the second vehicle 104 moves on the road 106. The processor 242 may determine that the second vehicle 104 may be in suboptimal condition when the processor 242 identifies the smaller/lighter items described above in the second vehicle 104 based on the sensor inputs.

The processor 242 may further determine (based on the sensor inputs) that the second vehicle 104 may be in the suboptimal condition when the load 108 and/or other objects disposed on the second vehicle 104 may extend above/past second vehicle bed rails or a second vehicle top portion. A person ordinarily skilled in the art may appreciate that such objects have potential to fly off from the second vehicle 104 due to wind force, especially when the second vehicle 104 moves at a high speed on the road 106. In some aspects, the processor 242 may determine such objects by using a pre-stored algorithm that calculates a ratio of load/object height relative to a second vehicle top portion height. If the calculated ratio is greater than a predefined ratio threshold, the processor 242 may determine that the load/object may potentially fall off from the second vehicle 104, and hence the second vehicle 104 may be in suboptimal condition.

The processor 242 may further determine (based on the sensor inputs) that the second vehicle 104 may be in suboptimal condition when a heterogeneous type of load (e.g., scrap metal pile, tree branches, etc., which may be difficult to strap at once) may be disposed on the second vehicle 104. A person ordinarily skilled in the art may appreciate that a homogenous type of load may be more securely placed on the second vehicle cargo bed as compared to a heterogeneous type of load. In this case, the processor 242 may first determine a load type based on the sensor inputs, and then determine that the second vehicle 104 may be in suboptimal condition when the load type may be heterogeneous.

Figure 3:
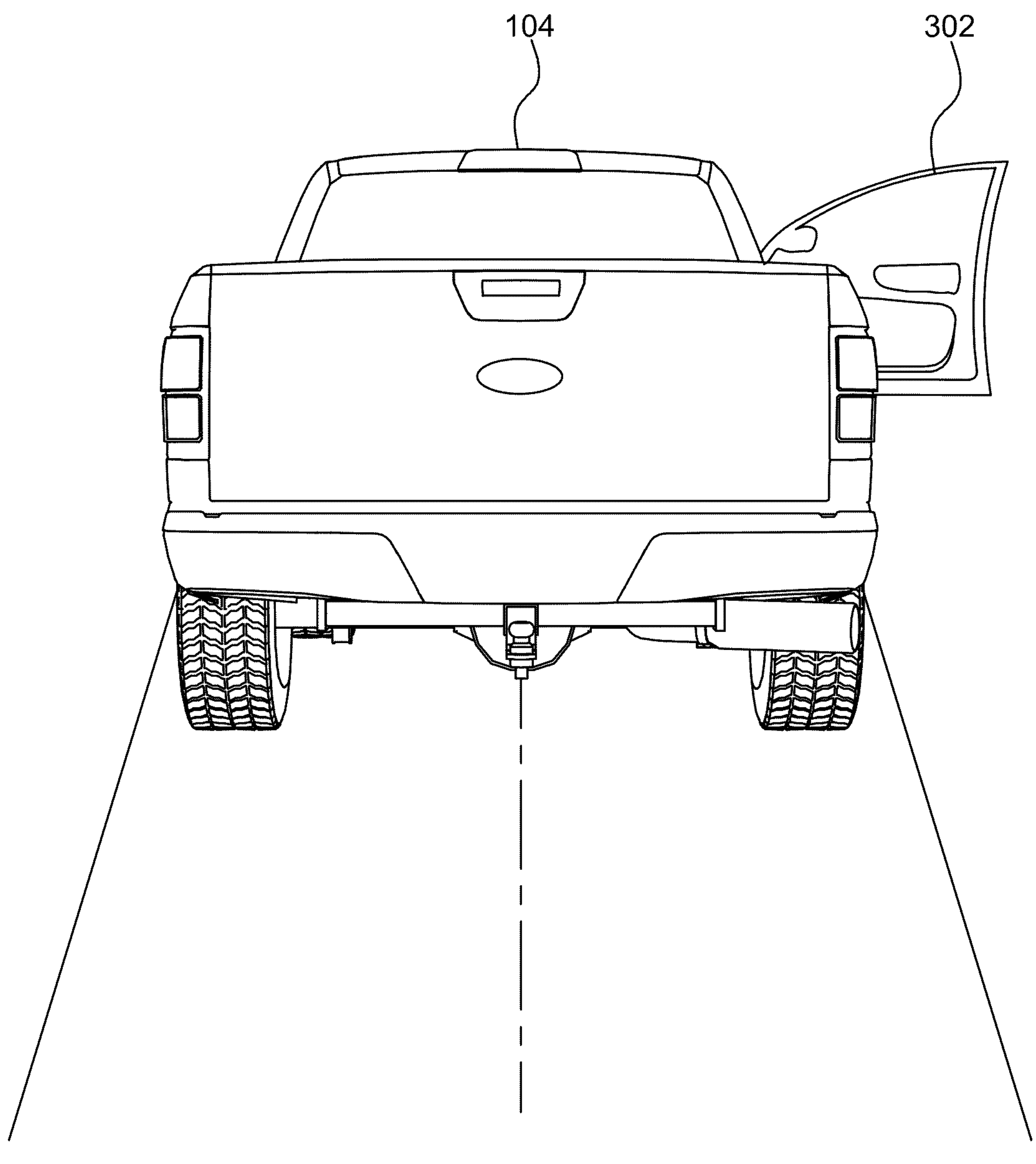
FIG. 3 depicts a snapshot of a vehicle with a door in an open state in accordance with the present disclosure.

The processor 242 may further determine (based on the sensor inputs) that the second vehicle 104 may be in suboptimal condition when one or more vehicle components associated with the second vehicle 104 may be in a broken state or falling off (or temporarily assembled using duct-tape or similar attachment means), or missing (e.g., tires or other second vehicle components may be missing). The processor 242 may additionally determine (based on the sensor inputs) that the second vehicle 104 may be in suboptimal condition when one or more vehicle doors/hoods/closures associated with the second vehicle 104 may be in an open state, as shown in FIG. 3. FIG. 3 depicts a snapshot of the second vehicle 104 with a passenger door 302 in the open state. The processor 242 may additionally determine (based on the sensor inputs) that the second vehicle 104 may be in suboptimal condition when the second vehicle 104 may have a bent frame or a misaligned frame relative to vehicle body's alignment or vehicle heading.

The processor 242 may further determine (based on the sensor inputs) that the second vehicle 104 may be in suboptimal condition when the processor 242 determines that a trailer (not shown) may be sub-optimally attached to the second vehicle 104. As an example, the processor 242 may determine that the trailer may be sub-optimally attached to the second vehicle 104 when there may be a substantial relative movement between the trailer and the second vehicle 104 at a connection point connecting the trailer with the second vehicle 104, when the second vehicle 104 moves on the road 106.

In each of the proceeding examples, the processor 242 is described to determine the suboptimal condition in an absolute sense (i.e., suboptimal in all conditions). In additional aspects, the processor 242 may determine (based on inputs obtained from the vehicle sensory system 232) that a vehicle condition may be suboptimal relative to specific vehicle speed and/or road conditions. It would be obvious to one skilled in the art that a vehicle load that may be acceptable at low vehicle speeds on a good road may be suboptimal at high vehicle speeds on a road that needs repair. The processor 242 may incorporate known speeds and/or road maps with road quality information stored in the memory 244 to more accurately determine whether the second vehicle 104 may be in a suboptimal condition.

Responsive to determining that the second vehicle 104 may be in suboptimal condition (or the trailer may be sub-optimally attached to the second vehicle 104) as described above, the processor 242 may perform one or more predefined actions. For example, the processor 242 may transmit, via the transceiver 240 and V2V/V2I communication and/or the network 206, a maintenance notification to the second vehicle 104 that may be output from a second vehicle HMI (not shown). In an exemplary aspect, the maintenance notification may include an indication that the load 108 may be sub-optimally secured to the second vehicle 104 and/or one or more vehicle components may be broken and/or falling off. Responsive to hearing/viewing the maintenance notification, a second vehicle operator may take remedial steps, thereby enhancing convenience of the commuters on the road 106. For example, the second vehicle operator may secure the load 108 properly to the second vehicle 104, responsive to hearing/viewing the maintenance notification.

Figure 4:
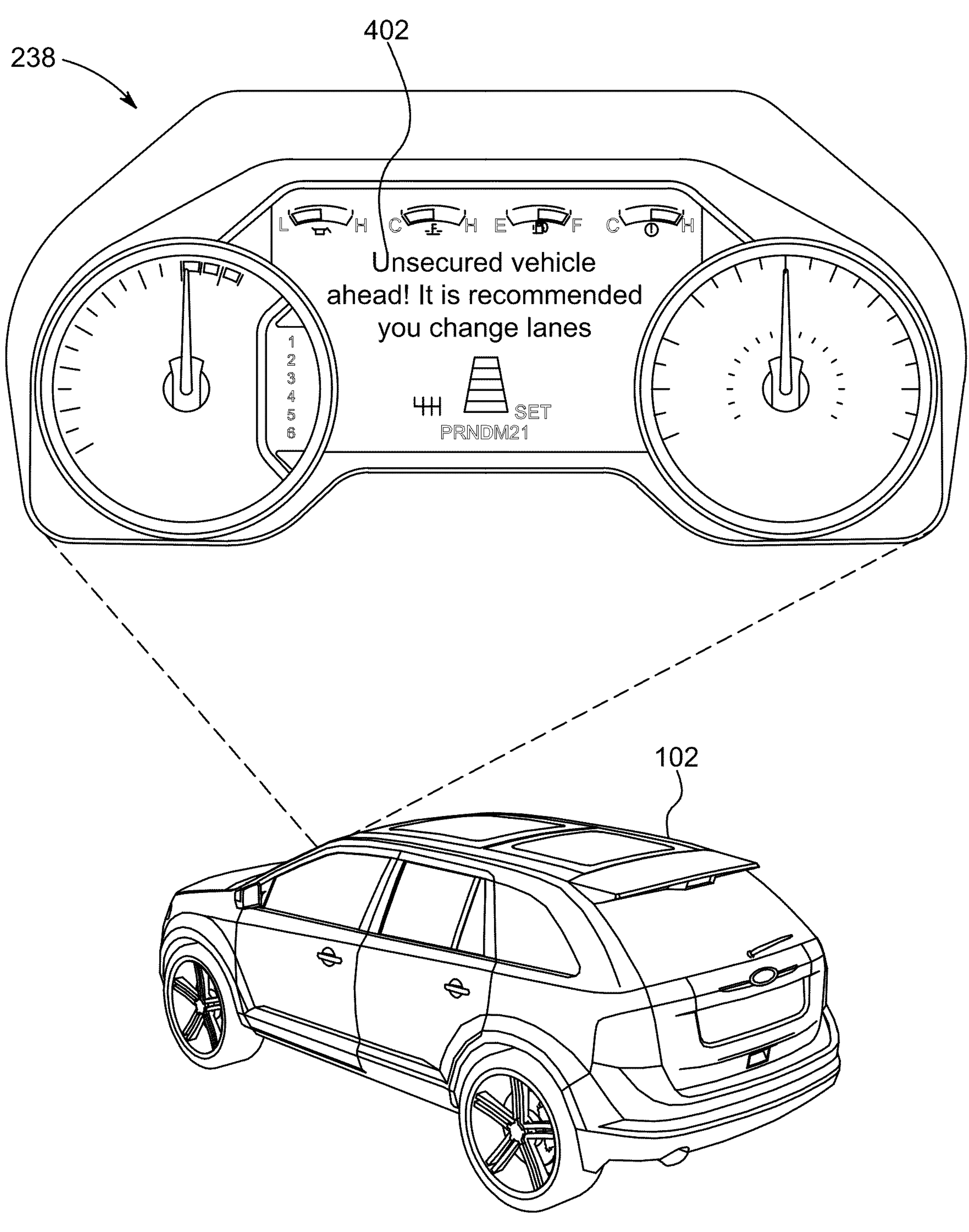
FIG. 4 depicts an alert notification being displayed on a vehicle Human-Machine Interface (HMI) in accordance with the present disclosure.

As another example, the processor 242 may transmit a first alert notification to the infotainment system 238 indicating the presence of the second vehicle 104 in suboptimal condition in proximity to the first vehicle 102. An example snapshot of the infotainment system 238, displaying a first alert notification 402 stating "Unsecured vehicle ahead! It is recommended you change lanes.", is shown in FIG. 4. In some aspects, the first alert notification may include a recommendation to prevent travelling on a route or a lane on which the second vehicle 104 may be travelling. Responsive to hearing/viewing the first alert notification 402 output from the infotainment system 238, a first vehicle operator may move the first vehicle 102 a predefined distance away from the second vehicle 104, change the lane on the road 106 and/or reduce or increase a first vehicle speed to cross the second vehicle 104. If the first vehicle 102 is an autonomous vehicle, the first vehicle 102 may autonomously move a predefined distance away from the second vehicle 104 responsive to the processor 242 transmitting the first alert notification. In this case, the processor 242 may transmit the first alert notification directly to the DAT controller 228 to cause an autonomous first vehicle movement.

In some aspects, the processor 242 may additionally transmit a route or lane recommendation to the infotainment system 238, indicating routes/lanes on the road 106 that may not include bumpy road stretches (as the probability of loose loads falling off from the second vehicle 104 may be high on bumpy roads). The first vehicle operator may view/hear the route/lane recommendation and may accordingly maneuver a first vehicle movement to prevent travelling on the routes/lanes that may include bumpy road stretches.

As yet another example, the processor 242 may transmit, via the transceiver 240 and V2V/V2I communication and/or the network 206, a second alert notification to the third vehicle 202 indicating the presence of the second vehicle 104 in suboptimal condition in proximity to the first vehicle 102 and/or the third vehicle 202. The second alert notification may include a recommendation to prevent travelling on a route or a lane on which the second vehicle 104 may be travelling. Responsive to hearing/viewing the second alert notification, a third vehicle operator may move away from the second vehicle 104 or change lanes on the road 106.

The processor 242 may be further configured to determine a second vehicle unique identifier based on the sensor inputs, and transmit information associated with the second vehicle unique identifier to the server 204 for storage purpose. The second vehicle unique identifier may include, for example, a second vehicle model, color, license plate identification, and/or the like. In some aspects, the processor 242 may obscure license plate identification to maintain privacy, before transmitting the information to the server 204.

The description above describes an aspect where the processor 242 itself determines, based on the sensor inputs, that the second vehicle 104 may be in suboptimal condition or the load 108 may be unsecured or minimally secured on the second vehicle 104; however, the present disclosure is not limited to such an aspect. In further aspects, when the processor 242 is unable to determine whether the load 108 may be properly secured to the second vehicle 104 or loosely secured, the processor 242 may transmit a request to the second vehicle 104 (e.g., via V2V communication) to obtain second vehicle camera feeds (e.g., camera feeds of rear exterior camera associated with the second vehicle 104). The processor 242 may use the second vehicle camera feeds to confirm whether the load 108 may be properly secured to the second vehicle 104 or loosely secured, and may accordingly perform the actions described above when the load 108 may be loosely secured.

Figure 5:
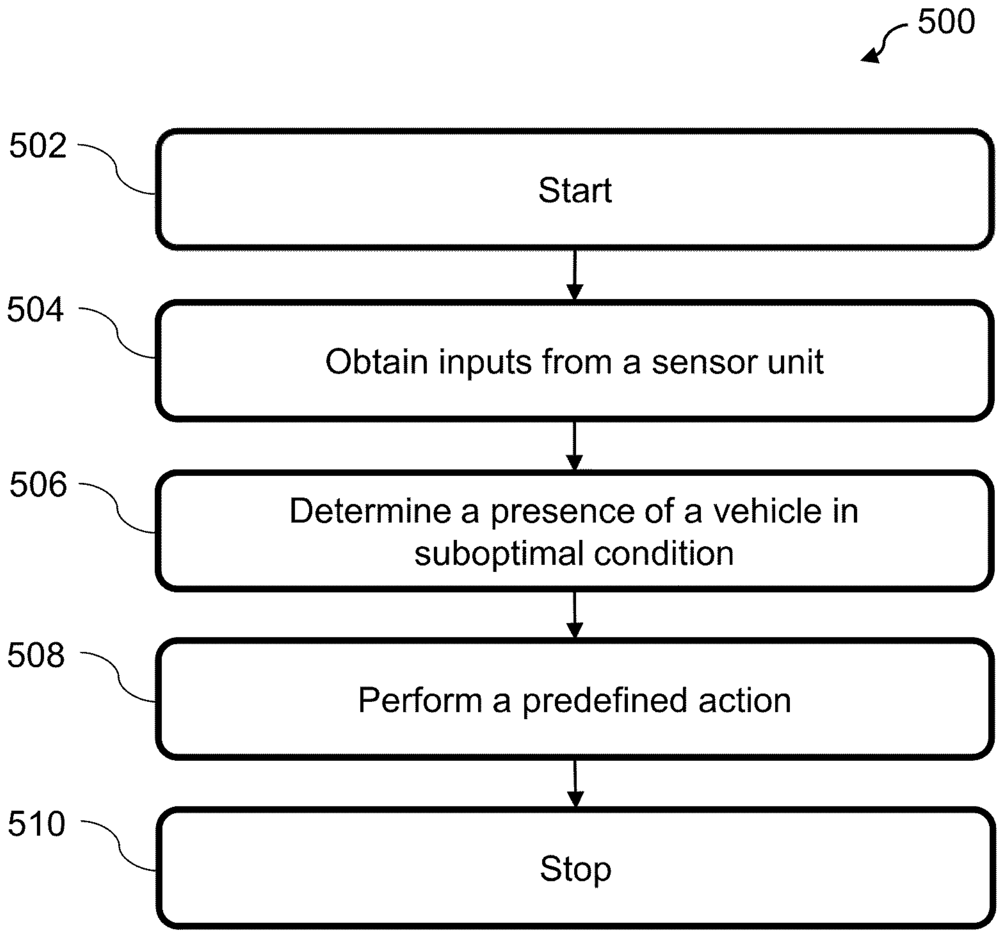
FIG. 5 depicts a flow diagram of a method for identifying a vehicle in suboptimal condition in accordance with the present disclosure.

FIG. 5 depicts a flow diagram of a method 500 for identifying a vehicle in suboptimal condition in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 242, the sensor inputs from the vehicle sensory system 232. At step 506, the method 500 may include determining, by the processor 242, a presence of the second vehicle 104 in suboptimal condition in proximity to the first vehicle 102 based on the sensor inputs. At step 508, the method 500 may include performing, by the processor 242, a predefined action responsive to determining the presence of the second vehicle 104 in suboptimal condition. Example actions performed by the processor 242 responsive to determining a second vehicle presence are described above in conjunction with FIG. 2.

The method 500 may end at step 510.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A first vehicle comprising:

a sensor unit configured to capture inputs associated with a first vehicle surrounding; and a processor communicatively coupled with the sensor unit, wherein the processor is configured to:

obtain the inputs from the sensor unit;

determine a presence of a second vehicle in a suboptimal condition in proximity to the first vehicle based on the inputs;

determine an inclination angle of a load plane relative to a second vehicle plane based on the inputs;

determine that a load is sub-optimally secured to the second vehicle when the inclination angle is greater than a predefined angle threshold; and perform a predefined action responsive to determining the presence of the second vehicle in the suboptimal condition, wherein the predefined action comprises autonomously moving the first vehicle a predefined distance away from the second vehicle.

2. The first vehicle of claim 1, wherein the second vehicle is in the suboptimal condition when a load disposed on the second vehicle is sub-optimally secured to the second vehicle.

3. The first vehicle of claim 2, wherein the processor is further configured to:

determine an extent of relative movement between the second vehicle and the load based on the inputs, when the second vehicle is in motion; and determine that the load is sub-optimally secured to the second vehicle when the extent of relative movement is greater than a predefined movement threshold.

4. The first vehicle of claim 2, wherein the processor is further configured to:

determine a count of attachment members securing the load to the second vehicle based on the inputs; and determine that the load is sub-optimally secured to the second vehicle when the count is less than a predefined count threshold.

5. The first vehicle of claim 2, wherein the processor is further configured to:

determine an inclination angle of a load plane relative to a second vehicle plane based on the inputs; and determine that the load is sub-optimally secured to the second vehicle when the inclination angle is greater than a predefined angle threshold.

6. The first vehicle of claim 1, wherein the second vehicle is in the suboptimal condition when one or more vehicle components associated with the second vehicle are in a broken state.

7. The first vehicle of claim 1, wherein the second vehicle is in the suboptimal condition when one or more vehicle doors, hoods, liftgates, trunks or other vehicle closures associated with the second vehicle are in an open state.

8. The first vehicle of claim 1, wherein the second vehicle is in the suboptimal condition when the second vehicle comprises tarps or covers with a potential to fly off when the second vehicle is moving, a second vehicle cargo bed comprises smaller or lighter items with the potential to fly off when the second vehicle is moving, the second vehicle comprises objects that extend past second vehicle bed rails or a second vehicle top portion, the second vehicle comprises a heterogeneous type of load that is difficult to strap, or the second vehicle comprises a missing tire or second vehicle component.

9. The first vehicle of claim 1, wherein the sensor unit comprises at least one of an exterior vehicle camera, a Radio Detection and Ranging (radar) sensor, and a Light Detection and Ranging (lidar) sensor.

10. The first vehicle of claim 1, wherein the predefined action comprises transmitting a maintenance notification to the second vehicle.

11. The first vehicle of claim 10, wherein the processor transmits the maintenance notification to the second vehicle via at least one of a vehicle-to-vehicle (V2V) communication and a vehicle-to-infrastructure (V2I) communication.

12. The first vehicle of claim 1, wherein the predefined action comprises transmitting a first alert notification to a first vehicle Human-Machine Interface (HMI) indicating a second vehicle presence in proximity to the first vehicle.

13. The first vehicle of claim 12, wherein the first alert notification comprises a recommendation to prevent travelling on a route on which the second vehicle is travelling.

14. The first vehicle of claim 1, wherein the predefined action comprises transmitting a second alert notification to a third vehicle indicating a second vehicle presence in proximity to the first vehicle, wherein the second alert notification comprises a recommendation to prevent travelling on a route on which the second vehicle is travelling.

15. The first vehicle of claim 1, wherein the processor is further configured to:

determine that a trailer is sub-optimally attached to the second vehicle based on the inputs; and perform the predefined action responsive to a determination that the trailer is sub-optimally attached to the second vehicle.

16. The first vehicle of claim 1, wherein the processor is further configured to determine a second vehicle unique identifier based on the inputs, and wherein the predefined action comprises transmitting information associated with the second vehicle unique identifier to a server.

17. A method comprising:

obtaining, by a processor, inputs from a sensor unit configured to capture the inputs associated with a first vehicle surrounding;

determining, by the processor, a presence of a second vehicle in a suboptimal condition in proximity to a first vehicle based on the inputs;

determining, by the processor, an inclination angle of a load plane relative to a second vehicle plane based on the inputs;

determining, by the processor, that a load is sub-optimally secured to the second vehicle when the inclination angle is greater than a predefined angle threshold; and performing, by the processor, a predefined action responsive to determining the presence of the second vehicle in the suboptimal condition, wherein the predefined action comprises autonomously moving the first vehicle a predefined distance away from the second vehicle.

18. The method of claim 17, wherein the second vehicle is in the suboptimal condition when a load disposed on the second vehicle is sub-optimally secured to the second vehicle.

19. A non-transitory computer-readable storage medium having instructions stored thereupon which, when executed by a processor, cause the processor to:

obtain inputs from a sensor unit configured to capture the inputs associated with a first vehicle surrounding;

determine a presence of a second vehicle in a suboptimal condition in proximity to a first vehicle based on the inputs;

determine an inclination angle of a load plane relative to a second vehicle plane based on the inputs;

determine that a load is sub-optimally secured to the second vehicle when the inclination angle is greater than a predefined angle threshold; and perform a predefined action responsive to determining the presence of the second vehicle in the suboptimal condition, wherein the predefined action comprises autonomously moving the first vehicle a predefined distance away from the second vehicle.

* * * * *